(12) United States Patent
Onozuka et al.

(10) Patent No.: US 10,120,115 B2
(45) Date of Patent: Nov. 6, 2018

(54) ILLUMINATION DEVICE

(71) Applicant: NICHIA CORPORATION, Anan-shi, Tokushima (JP)

(72) Inventors: Katsuyuki Onozuka, Nagano (JP); Wataru Ogura, Suwa (JP); Yoshitaka Tanaka, Suwa (JP)

(73) Assignee: NICHIA CORPORATION, Anan-Shi (JP)

( * ) Notice: Subject to any disclaimer, the term of this patent is extended or adjusted under 35 U.S.C. 154(b) by 0 days.

(21) Appl. No.: 15/783,945

(22) Filed: Oct. 13, 2017

(65) Prior Publication Data
US 2018/0106943 A1 Apr. 19, 2018

(30) Foreign Application Priority Data

Oct. 14, 2016 (JP) .................................. 2016-202669

(51) Int. Cl.
*F21V 8/00* (2006.01)
*F21K 9/61* (2016.01)
(Continued)

(52) U.S. Cl.
CPC .............. *G02B 6/0006* (2013.01); *F21K 9/61* (2016.08); *G02B 6/001* (2013.01);
(Continued)

(58) Field of Classification Search
CPC ...... G02B 5/02; G02B 6/0016; G02B 6/0006; G02B 6/001; G02B 6/4298; G02B 6/02342; G02B 6/02319; G02B 6/4249; G02F 1/133504; G02F 1/133606; F21K 9/61; F21V 2200/10; F21Y 2101/00
See application file for complete search history.

(56) References Cited

U.S. PATENT DOCUMENTS 8,442,078 B1 * 5/2013 Stolyarov ............. G02F 1/1326
372/51
2012/0251050 A1 * 10/2012 Lin ....................... G02B 6/3825
385/53
(Continued)

FOREIGN PATENT DOCUMENTS

JP    H05-188251 A    7/1993
JP    H09-35517 A     2/1997
(Continued)

*Primary Examiner* — Joseph L Williams
*Assistant Examiner* — Jose M Diaz
(74) *Attorney, Agent, or Firm* — Foley & Lardner LLP

(57) ABSTRACT

An illumination device includes: an optical fiber, the optical fiber allowing light emitted from a light source to be introduced at a first end portion thereof and to be guided through the optical fiber while emitting a portion of the light through a side surface of the optical fiber; a light-transmissive tube, the light-transmissive tube covering the side surface of the optical fiber such that a gap is located between the tube and the side surface of the optical fiber; and a light-shielding cap covering a second end portion of the tube at a side opposite the light source such that a space is located between a bottom portion of the cap and the second end portion of the tube. A second end portion of the optical fiber projects past the second end portion of the tube and is located at an inner side of the cap.

6 Claims, 2 Drawing Sheets

(51) Int. Cl.
*F21Y 101/00* (2016.01)
*G02B 6/02* (2006.01)
*G02B 6/42* (2006.01)

(52) U.S. Cl.
CPC ....... *G02B 6/02342* (2013.01); *G02B 6/4298* (2013.01); *F21V 2200/10* (2015.01); *F21Y 2101/00* (2013.01); *G02B 6/02319* (2013.01); *G02B 6/4249* (2013.01)

(56) References Cited

U.S. PATENT DOCUMENTS

| | | | |
|---|---|---|---|
| 2013/0088888 A1 | 4/2013 | Fewkes et al. | |
| 2014/0016345 A1* | 1/2014 | Nishio | G01J 1/0271 362/552 |
| 2014/0198520 A1* | 7/2014 | Bennett | G02B 6/001 362/556 |
| 2015/0369991 A1* | 12/2015 | Bauco | G02B 6/4204 362/555 |
| 2016/0025916 A1* | 1/2016 | Tyagi | G02B 6/0003 362/583 |
| 2016/0116660 A1* | 4/2016 | Benjamin | G02B 6/02395 362/553 |
| 2017/0115442 A1* | 4/2017 | Dellock | B60Q 1/2696 |
| 2017/0254508 A1* | 9/2017 | Kawachi | F21V 29/503 |
| 2017/0315318 A1* | 11/2017 | Modavis | G02B 6/001 |
| 2018/0095214 A1* | 4/2018 | Onozuka | F21K 9/20 |

FOREIGN PATENT DOCUMENTS

| | | | |
|---|---|---|---|
| JP | 11084136 A * | 3/1999 | G02B 6/001 |
| JP | 2000-275444 A | 10/2000 | |
| JP | 2007-260192 A | 10/2007 | |
| JP | 2013-229174 A | 11/2013 | |
| JP | 2014-534565 A | 12/2014 | |
| WO | WO-2013-052413 A1 | 4/2013 | |

* cited by examiner

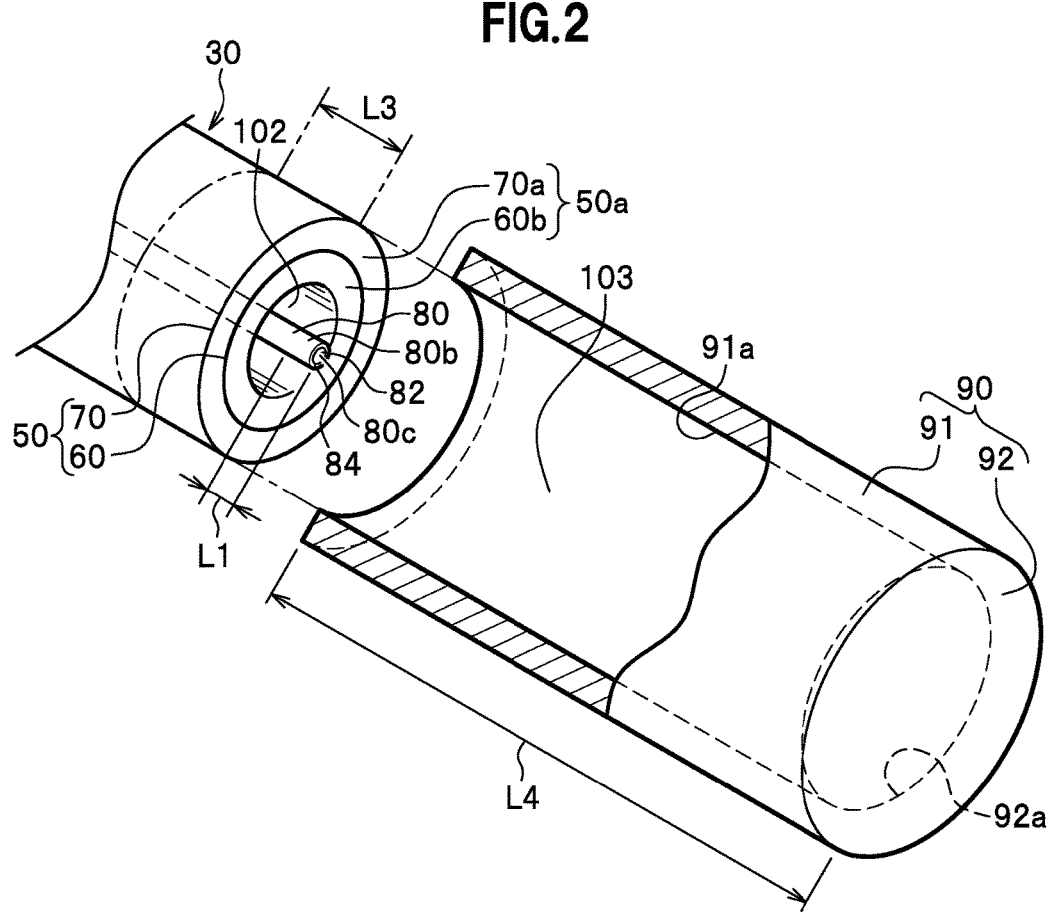

ILLUMINATION DEVICE

CROSS-REFERENCE TO RELATED APPLICATIONS

The present application claims priority under 35 U.S.C. § 119 to Japanese Patent Application No. 2016-202669, filed on Oct. 14, 2016, the contents of which are hereby incorporated by reference in their entirety.

BACKGROUND

1. Field of the Invention

The present disclosure relates to an illumination device.

2. Description of Related Art

Conventionally, optical fibers have been known to be used for illumination devices. For example, Japanese Patent Publication No. 2014-534565 (hereinafter referred to as Patent Document 1) describes an illumination system in which a semiconductor laser (Laser Diode) is used for a light source, and light emitted from the semiconductor laser is allowed to pass through a light diffusing fiber to excite phosphor in a cover layer disposed surrounding the light diffusing fiber, which allows for emitting diffused light. This illumination system includes a light-reflecting mirror at an end portion of the light diffusing fiber.

Japanese patent publication No. 2000-275444 (hereinafter referred to as Patent Document 2) describes a light emitting device including an optical fiber having an end surface on which a reflective film is disposed. Similarly to the mirror described in patent document 1, this reflective film reflects light emitted from a semiconductor laser so that the reflected light propagates back to the semiconductor laser.

SUMMARY

As described in Patent Documents 1 and 2, there have been known light diffusing fibers including a mirror or the like at an end portion thereof to reflect light from a semiconductor laser to attenuate the energy of the light at the end portion thereof.

Recently, output of semiconductor lasers, which was conventionally several ten milliwatts, has increased to, for example, approximately 3 watts. In accordance with the increase in output of such semiconductor lasers used for light sources, the energy density of the light at end surfaces of the light diffusing fibers has increased from about 0.13 kW/cm$^2$ to about 1.5 kW/cm$^2$.

Accordingly, if a gap or space between an end portion of an optical fiber and a mirror is filled with a deposit such as dust or dirt, the deposit may absorb light and generate heat of a high temperature, and the heat accumulated in the deposit may cause the degradation of components near the optical fiber and/or the optical fiber itself.

Certain embodiments according to the present disclosure can provide illumination devices that can reduce the degradation of constituent components of the illumination devices.

An illumination device according to one of the present disclosure includes: an optical fiber having a first end portion and a second end portion opposite to the first end, the optical fiber allowing light emitted from a light source to be introduced at the first end portion thereof and to be guided through the optical fiber while emitting a portion of the light through a side surface of the optical fiber; a light-transmissive tube having a first end portion and a second end portion opposite to the first end portion, the light-transmissive tube covering the side surface of the optical fiber such that a gap is located between the tube and the side surface of the optical fiber; and a light-shielding cap covering the second end portion of the tube at a side opposite the light source such that a space is located between a bottom portion of the cap and the second end portion of the tube. The second end portion of the optical fiber projects past the second end portion of the tube and is located at an inner side of the cap. The second end portion of the optical fiber projects past the second end portion of the tube and is located at an inner side of the cap.

In an illumination device according to the present disclosure, the degradation of constituent components of the illumination devices can be reduced.

BRIEF DESCRIPTION OF THE DRAWINGS

A more complete appreciation of embodiments of the invention and many of the attendant advantages thereof will be readily obtained by reference to the detailed description below when considered in connection with the accompanying drawings.

FIG. 2 is a schematic perspective view illustrating a light emitter and a cap in the illumination device according to the embodiment, in a state in which the cap has been detached from the light emitter. In FIG. 2, a cross-section of a part of the cap is schematically shown.

DETAILED DESCRIPTION

Figure 1:
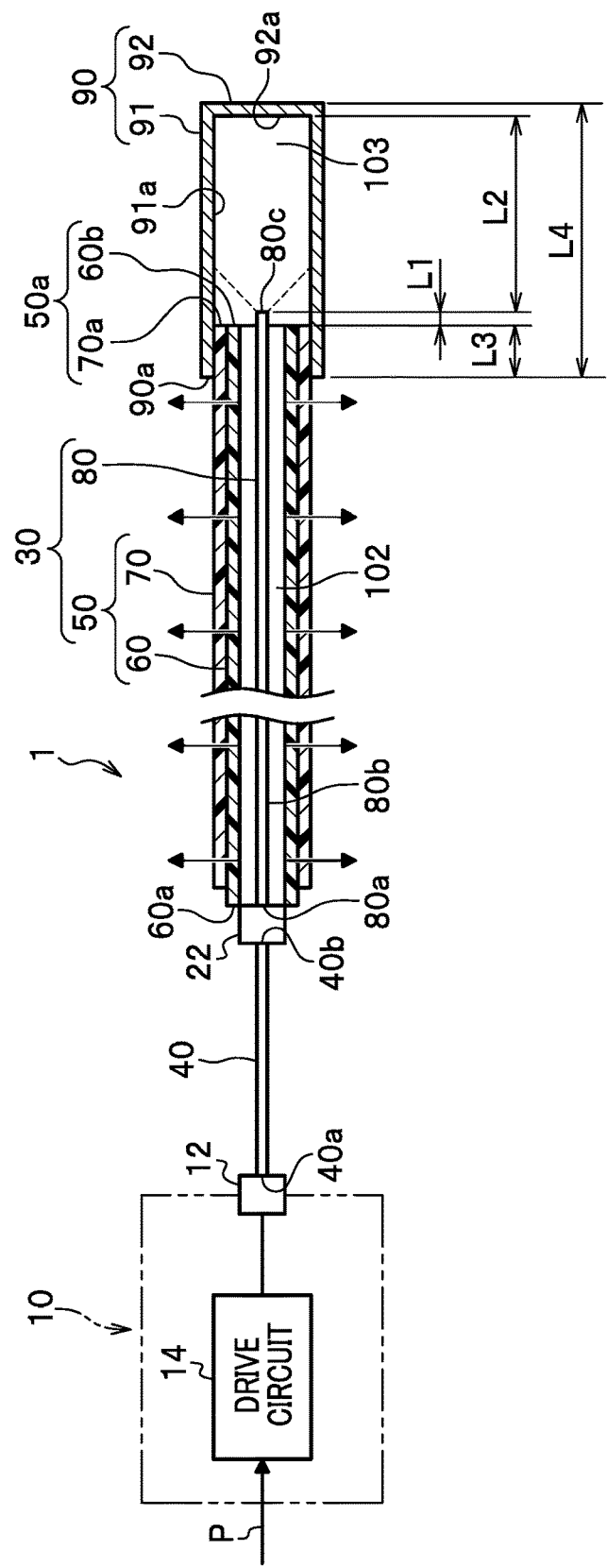
FIG. 1 is a schematic cross-sectional view showing an entire configuration of an illumination system including an illumination device according to one embodiment.

Embodiment of the present disclosure are described below with reference to the accompanied drawings.

A description is given of an illumination device according to the present embodiment with reference to FIGS. 1 and 2. It should be appreciated, however, that the embodiment described below is merely an illustration of an illumination device for embodying the technical idea of the present disclosure. The scope of the invention is not intended to be limited to the embodiments described below. Unless otherwise specified, the dimensions, materials, shapes, relative layouts, and so forth of the constituent components discussed in the embodiments are given merely as examples and are not intended to limit the scope of the present invention. Furthermore, to make the description clearer, the size, positional relations, and so forth of the members shown in the drawings may be exaggerated, and the shapes of the members may be shown in a simplified manner. In the description below, the same member or members made of the same material are given the same name or number, and duplicative detailed descriptions are appropriately omitted.

An illumination device 1 according to the present embodiment includes: a light emitter 30 that provides illumination by using a light guiding fiber 40 through which light from a light generating device 10 including a light source 12 passes; and a cap 90 attached to the light emitter 30.

The light source 12 is a semiconductor light emitting element such as a semiconductor laser element (e.g., laser diode) configured to emit light when power is supplied from the outside. The light source 12 is a constituent member of the light generating device 10 and configured to emit light when input power P is supplied from a drive circuit 14.

The light source 12 is connected to a first end portion 40a of the light guiding fiber 40. A second end portion 40b of the light guiding fiber 40, which is opposite the first end portion 40a, is connected to a connector 22 of the light emitter 30.

The light emitted from the light source 12 is guided toward the light emitter 30 via the light guiding fiber 40 and the connector 22.

The light emitter 30 has the connector 22, a tube 50 having a double-structure, that is, including a light-transmissive tube 60 and a phosphor tube 70, which are described below, and an optical fiber 80.

The connector 22 connects the light guiding fiber 40 and the optical fiber 80 of the light emitter 30, and is configured to transfer the light from the light guiding fiber 40 to the optical fiber 80. The connector 22 may have any appropriate configuration so long as the connector 22 can allow light from the second end portion 40b of the light guiding fiber 40 to enter a first end portion 80a of the optical fiber 80.

FIG. 2 is a schematic perspective view illustrating the light emitter 30 and the cap 90 in the illumination device 1 according to the present embodiment, in a state in which the cap 90 is detached from the light emitter 30. In FIG. 2, a cross-section of a part of the cap 90 is schematically shown. As shown in FIG. 2 with reference to FIG. 1, the optical fiber 80 in the present embodiment is a light diffusing fiber configured to emit light through a side surface thereof while guiding light therethrough. The optical fiber 80 includes a core 82 and a cladding 84. The core 82 is mainly made of silica glass and configured to guide the light in a direction in which the core 82 extends. The cladding 84 is a diffusing layer made of a resin material having a refractive index different from that of the core 82 and covering the periphery of the core 82. The cladding 84 has light-transmissive properties to allow the light being guided through the core 82 to diffuse outward in a diameter direction of the optical fiber to emit through a side surface 80b of the cladding 84.

Light emitted from the light generating device 10 is introduced into the optical fiber 80 at the first end portion 80a thereof, to be emitted through the second end portion 80c of the optical fiber 80, and to be guided through the optical fiber 80 while also emitting through the side surface 80b of the optical fiber 80 to the outside. The light emitted through the side surface 80b of the optical fiber 80 passes through a gap 102 and then the light-transmissive tube 60 that covers the optical fiber 80, and excites phosphor contained in the phosphor tube 70 disposed at an outside of the light-transmissive tube 60. Thus, in the light emitter 30, the light from the optical fiber 80 and the light from the phosphor allows the tube 50 to emit light as a whole.

Light guided through the optical fiber 80 is emitted from the second end portion 80c thereof toward the outside. The light has a high energy density in the vicinity of the second end portion 80c. In view of this, to inhibit the blackening or the like of the tube 50, the light-transmissive tube 60 and the phosphor tube 70 are arranged spaced apart from the second end portion 80c of the optical fiber 80 such that the light-transmissive tube 60 and the phosphor tube 70 are not directly irradiated with the light emitted from the second end portion 80c. More specifically, the second end portion 80c of the optical fiber 80 projects past a second end portion 60b of the light-transmissive tube 60 and an end portion 70a of the phosphor tube 70 at a predetermined projection dimension L1. The second end portion 80c has an end surface extending in a direction perpendicular to the longitudinal direction of the optical fiber 80 and located inside the cap 90 such that the light emitted from the second end portion 80c illuminates an inner surface of the cap 90.

The projection dimension L1 is selected such that the vicinity of the second end portion 60b of the light-transmissive tube 60 and an end portion 70a of the phosphor tube 70 are not directly irradiated by the light from the optical fiber 80. In view of the flexure of the like of the light emitter 30, the second end portion 80c is located at an outer side of the second end portion 60b and the end portion 70a at about 0.1 millimeter to several millimeters.

The tube 50 includes the light-transmissive tube 60 as an inner tube, and includes the phosphor tube 70 as an outer tube. The light-transmissive tube 60 has a first end portion 60a, which is in contact with and supported by the connector 22. The connector 22 is arranged so as to guide light from the second end portion 40b of the light guiding fiber 40 into the first end portion 80a of the optical fiber 80. The light-transmissive tube 60 and the phosphor tube 70 each serve also as a protective tube for inhibiting the optical fiber 80 from bending. Optionally, the light-transmissive tube 60 may be omitted. However, in the illumination device 1, which provides illumination by the light from the optical fiber 80 and the light from the phosphor, with the light-transmissive tube 60 between the optical fiber 80 and the phosphor tube 70, bending of the optical fiber 80 can further be inhibited.

The light-transmissive tube 60 and the phosphor tube 70 have approximately the same dimension in a lengthwise direction thereof, and are made of a transparent material such as a polyvinyl chloride resin. The optical fiber 80 has a length slightly greater than a length of each of the light-transmissive tube 60 and the phosphor tube 70, and has a side surface 80b a large portion of which is covered by the light-transmissive tube 60 and the phosphor tube 70 with a gap 102 between the side surface 80b and the light-transmissive tube 60.

The phosphor tube 70 contains a phosphor adapted to be excited by the light emitted from the side surface 80b of the optical fiber 80. The phosphor tube 70 may be made of a resin material having flexibility or a glass material having rigidity. Examples of the resin material include a silicone resin, an epoxy resin, a phenolic resin, a polycarbonate resin, an acrylic resin, a TPX resin, a polynorbornene resin, a modified resin of these resins, and a hybrid resin of two or more of these. Examples of the glass material include a borosilicate glass, a quartz glass, a sapphire glass, a calcium fluoride glass, an aluminoborosilicate glass, an oxynitride glass, and a chalcogenide glass.

The phosphor tube 70 may contain a phosphor used in the field of the present invention as appropriate. Examples of the phosphor that are excitable by light emitted from a blue-color light emitting element or an ultraviolet light emitting element include: a cerium-activated yttrium-aluminum-garnet-based fluorescent material (YAG:Ce); a cerium-activated lutetium-aluminum-garnet-based fluorescent material (LAG:Ce); an europium- and/or chromium-activated nitrogen-containing calcium aluminosilicate based fluorescent material ($CaO$—$Al_2O_3$—$SiO_2$:Eu); an europium-activated silicate-based fluorescent material (($Sr,Ba)_2SiO_4$:Eu); a nitride-based fluorescent material such as a β-sialon fluorescent material, a CASN-based fluorescent material ($CaAlSiN_3$:Eu), a SCASN-based fluorescent material ((Sr, Ca)$AlSiN_3$:Eu); a KSF-based fluorescent material ($K_2SiF_6$:Mn); a sulfide-based fluorescent material; and a quantum dot fluorescent material. A combination of those phosphors and a blue-color or ultraviolet light emitting element allows emission of various colors. The concentration of the phosphor contained in the phosphor tube 70 is about 5% by mass to about 50% by mass, for example.

The light-transmissive tube 60 does not contain a phosphor, and thus has a light transmittance higher than a transmittance of the phosphor tube 70. The light-transmissive tube 60 is disposed between the phosphor tube 70 and the optical fiber 80 at an inner side of the phosphor tube 70. The gap 102 is defined by the periphery of the optical fiber 80 and the light-transmissive tube 60.

At an end portion of the phosphor tube 70, in addition to degradation due to blackening, degradation in wavelength conversion efficiency of the phosphor due to increase in temperature is known to occur. In view of this, with the gap 102 defined by the optical fiber 80 and the phosphor tube 70 and the second end portion 80c of the optical fiber 80 projecting at an inner side of the cap 90, the light-transmissive tube 60 and the phosphor tube 70 can be inhibited from being directly irradiated with high energy-density light from the second end portion 80c, which can inhibit the phosphor tube 70 from being heated to a high temperature.

The tube 50 has an end portion 50a opposite to a light source 12 side, and the cap 90 is fitted with the tube 50 at the end portion 50a. The cap 90 has a hollow cylindrical shape and has light-shielding properties. The cap 90 includes a cylindrical portion 91 extending in the axial direction thereof with a substantially uniform diameter and has a bottom portion 92 with a disk-like shape. The bottom portion 92 has an inner bottom surface 92a having a disk-like shape and is spaced apart from the second end portion 80c of the optical fiber 80 in the axial direction at a predetermined dimension L2. The cap 90 has an open end 90a opposite to the bottom portion 92. Each of an inner diameter of the cap 90 and an outer diameter of the tube 50 has a size that allows the cap 90 and the tube 50 to be in contact with each other and to be engaged with each other by a friction force.

The open end 90a of the cap 90 is inserted over the tube 50 from the end portion 50a thereof at a predetermined dimension L3 such that the second end portion 80c of the optical fiber 80 is located at an inner side of the cap 90. In other words, the cap 90 is fitted over the tube 50 so as to cover the second end portion 80c of the optical fiber 80 from the outside. The predetermined dimension L3 is selected such that the second end portion 80c of the optical fiber 80 is not in contact with the inner bottom surface 92a of the bottom portion 92. That is, in order to secure a sufficient length of the dimension L2 that allows the energy density of the light to be sufficiently be reduced, the dimension L3 is less than or equal to a predetermined length with respect to the entire length of the dimension L4 of the cap 90.

The cap 90 is made of aluminum or an aluminum alloy, which are light-shielding materials. Aluminum and an aluminum alloy have a lower absorption of blue light (i.e., light having a wavelength of about 450 nm) and have better thermal conductivity in comparison with other metals or alloys, and thus are expected to provide heat dispersion and dissipation effects. Further, aluminum and an aluminum alloy have good machinability and do not easily impair the quality of appearance of the illumination device 1.

In the illumination device 1 according to the present embodiment, aluminum or an aluminum alloy is used for a material of the cap 90, but any other appropriate material may be used for the cap 90. For example, other metal material such as silver, copper, an alloy thereof, or ceramic materials, which have good heat resistance, may be used for a material of the cap 90.

In addition, the cap 90 may not be entirely made of the same light-shielding material. A light shielding material is used for at least a portion of the cap 90 which does not overlap with the tube 50.

Next, a description will be given of an operation and advantages of the illumination device 1 according to the present embodiment.

The illumination device 1 according to the present embodiment allows the light source 12 to emit light, and allows the light to pass through the light guiding fiber 40 to guide the light through the connector 22 into the light emitter 30.

In the light emitter 30, as shown by the arrows in FIG. 1, the cladding 84 allows a portion of the guided light to be emitted from the side surface 80b to the outside while the guided light passes through the optical fiber 80, and to excite the phosphor in the phosphor tube 70 disposed at an outer side of the light-transmissive tube 60.

Meanwhile, a portion of light guided into the core 82 of the optical fiber 80 passes through the core 82 and is emitted from the second end portion 80c into a space 103 of the cap 90. As a result, the light emitted from the second end portion 80c of the optical fiber 80 located at an inner side of the cap 90 irradiates inner surfaces of the cap 90 that covers the second end portion 80c, i.e., an inner side surface 91a of the cylindrical portion 91 and the inner bottom surface 92a of the bottom portion 92.

The space 103 is present between the second end portion 80c of the optical fiber 80 and the inner side surface 91a and the inner bottom surface 92a of the cap 90 such that the second end portion 80c is spaced apart from the inner bottom surface 92a in an axial direction of the cap 91 at a predetermined dimension L2 . With this structure, even if a light has a high energy density at the second end portion 80c, the energy density of the light decreases in the space 103 until the light reaches the inner side surface 91a and/or the inner bottom surface 92a.

Thus, even if the second end portion of the tube 50 is irradiated with light reflected by the inner side surface 91a and/or the inner bottom surface 92a, blackening of the tube can be reduced. In addition, the cap 90 shields light from the second end portion 80c of the optical fiber 80, so that safety can be ensured.

With the second end portion 80c located at an inner side of the cap 90, even in the case where a semiconductor laser configured to emit light having relatively high energy density is used for the light source 12, thermal influence on the tube 50 can be reduced, and thus the degradation of components around the second end portion 80c and the optical fiber can be reduced. In addition, the structure does not require arrangement of a mirror or the like at the second end portion 80c to reflect light from the semiconductor laser, so that an expensive optical isolator as a countermeasure against the return light from the mirror may not be arranged.

Heat can be dissipated over the entirety of the cap 90 to increase heat dissipation efficiency, so that degradation of components around the second end portion 80c of the optical fiber 80, the end portion 50a of the tube 50, or the like can be inhibited. Further, aluminum and aluminum alloy have good machinability and allows the cap 90 to have a good design to improve the quality of the appearance of the illumination device 1.

The phosphor tube 70 contains phosphor adapted to be excited by the light emitted from the side surface 80b of the optical fiber 80. With this arrangement, light from the optical fiber 80 and light from the phosphor allow the outer side surface of the light emitter 30 to emit light uniformly over substantially the entire length of the outer side surface of the light emitter 30. Therefore, in the illumination device 1, unevenness in such as emission color and brightness can be reduced, and thus appearance of the illumination device can be improved.

The light emitted from the side surface 80b of the optical fiber 80 passes through a gap 102 and then the light-transmissive tube 60 that is spaced apart from the side surface 80b over the whole length thereof at a predetermined distance, and excites the phosphor contained in the phosphor tube 70 disposed at an outer side of the light-transmissive tube 60. The second end portion 80c of the optical fiber 80, at which the light has the greatest energy density, projects past the end portion 50a of the tube 50 and is located in the space 103 located inside the cap 90. Accordingly, the end portion 60b and the second end portion 70a, which constitute the end portion 50a of the tube 50 are not exposed to the light emitted from the second end portion 80c of the optical fiber 80 with a high energy density. In addition, the optical fiber 80 can be inhibited from being in contact with the phosphor tube 70, and blackening of the tube 50 can be inhibited. Therefore, the degradation of those constituent components can be reduced, and the appearance of the illumination device 1 can be improved.

In the above description of the illumination device 1, the cap 90 has been described to be attached to the tube 50 with a friction force. Alternatively, the tube 50 may have an engaging portion such as a male screw or a projection at a portion spaced apart from the end portion 50a of the tube 50, and the cap 90 may have a female screw or a projection-receiving hole formed in the inner surface of the cap 90, so that the tube 50 and the cap 90 are able to be engaged with each other. Further alternatively, the tube 50 and the cap 90 may be bonded with each other by using an adhesive or other bonding mechanism. In the illumination device 1, the tube 50 does not necessarily have a double layered structure. The tube 50 may have a single layer structure or a multilayer structure made of three or more layers.

The illumination device according to certain embodiments of the present disclosure may be used in various illumination systems in which a light emitting element such as a semiconductor light emitting element, e.g., a light emitting diode, is installed as a light source. For example, the illumination device can be applied to various light sources such as light sources of backlight devices for liquid crystal display devices, various lighting equipment, large-sized display devices, various display devices such as advertisements or guideboards, or image readers in digital camcorders, fax machines, copiers or scanners, projectors, or the like.

What is claimed is:

1. An illumination device comprising:
   an optical fiber having a first end portion and a second end portion opposite to the first end portion, the optical fiber allowing light emitted from a light source to be introduced at the first end portion thereof and to be guided through the optical fiber while emitting a portion of the light through a side surface of the optical fiber;
   a light-transmissive tube having a first end portion and a second end portion opposite to the first end portion, the light-transmissive tube covering the side surface of the optical fiber such that a gap is located between the tube and the side surface of the optical fiber; and
   a light-shielding cap covering the second end portion of the tube at a side opposite the light source such that a space is located between a bottom portion of the cap and the second end portion of the tube,
   wherein the second end portion of the optical fiber projects past the second end portion of the tube and is located at an inner side of the cap.

2. The illumination device according to claim 1, wherein the cap is made of aluminum or an alloy of aluminum.

3. The illumination device according to claim 1, wherein the tube comprises a phosphor tube containing a phosphor adapted to be excited by the portion of light emitted from the side surface of the optical fiber.

4. The illumination device according to claim 2, wherein the tube comprises a phosphor tube containing a phosphor adapted to be excited by the portion of light emitted from the side surface of the optical fiber.

5. The illumination device according to claim 3, wherein the tube comprises a light-transmissive tube at an inner side of the phosphor tube.

6. The illumination device according to claim 4, wherein the tube comprises a light-transmissive tube at an inner side of the phosphor tube.

\* \* \* \* \*